US006578994B1

United States Patent
Beyerlein

(10) Patent No.: US 6,578,994 B1
(45) Date of Patent: Jun. 17, 2003

(54) SPOTLIGHT, IN PARTICULAR A READING LIGHT IN CABINS OF VEHICLES AND CRAFT

(75) Inventor: Wolfgang Beyerlein, Mittelschenbach (DE)

(73) Assignee: Diehl Luftfahrt Elecktronik GmbH, Röthenbach (DE)

( * ) Notice: Subject to any disclaimer, the term of this patent is extended or adjusted under 35 U.S.C. 154(b) by 0 days.

(21) Appl. No.: 09/588,484

(22) Filed: Jun. 6, 2000

(30) Foreign Application Priority Data

Jun. 11, 1999 (DE) .......................... 199 26 561

(51) Int. Cl.[7] ............................................. F21M 3/18
(52) U.S. Cl. ..................... 362/490; 362/419; 362/473; 362/800; 362/238; 362/239
(58) Field of Search ................................ 362/479, 490, 362/545, 244, 250, 800, 373, 555, 471, 508, 523, 35, 269, 271, 427, 428, 366, 238, 239, 419

(56) References Cited

U.S. PATENT DOCUMENTS

| 4,463,413 A | * | 7/1984 | Shirley ...................... 362/401 |
|---|---|---|---|
| 5,303,134 A | * | 4/1994 | Cunado ...................... 362/372 |
| 5,377,087 A | * | 12/1994 | Yoon ........................... 362/275 |
| 5,404,297 A | * | 4/1995 | Birk et al. .................. 362/421 |
| 5,580,163 A | * | 12/1996 | Johnson, II ................. 362/285 |
| 5,695,279 A | * | 12/1997 | Sonnleitner et al. ........ 362/419 |
| 5,984,494 A | * | 11/1999 | Chapman et al. ........... 362/470 |
| 6,249,375 B1 | * | 6/2001 | Silhengst et al. ........... 362/268 |

* cited by examiner

Primary Examiner—Sandra O'Shea
Assistant Examiner—Anabel Ton
(74) Attorney, Agent, or Firm—Scully, Scott, Murphy & Presser

(57) ABSTRACT

There is proposed a spotlight, in particular a reading light in cabins of vehicles and craft, in particular aircraft, which has preferably white light-emitting light-emitting diodes (1) which are radially encased by a body, wherein a lens body (6) is fitted on the end light exit opening of the body, as the lighting source and a frame (9) which carries the lighting source and which is pivotable or rotatable about at least one horizontal and/or vertical axis and is adapted to be fixed in the respective selected position. The frame (9) can be received by a receiving body (13) and is supported therein pivotably or rotatably about at least a horizontal axis (14). The receiving body (13) is held in a fixing ring (21) and is rotatable about a vertical axis. The frame (9) with the receiving body (13) and/or the receiving body (13) with the fixing ring (21) are latchable respectively through a spring and in a resiliently latched manner.

11 Claims, 2 Drawing Sheets

SPOTLIGHT, IN PARTICULAR A READING LIGHT IN CABINS OF VEHICLES AND CRAFT

BACKGROUND OF THE INVENTION

1. Field of the Invention

The invention relates to a spotlight, in particular a reading light in cabins of vehicles and craft, in particular aircraft, which includes light-emitting diodes preferably emitting a white light as the lighting source.

2. Discussion of the Prior Art

German patent application DE 199 08 040.2 which is assigned to the present applicants, which is of earlier date but which hitherto has not been published, discloses an arrangement for lighting or illuminating rooms or spaces, bodies or surfaces, in particular a reading light for aircraft, comprising at least one light source in the form of a white light-emitting diode or a luminescence conversion diode. In that light, the light-emitting diodes are radially encased by a body, to whose front free end light exit opening is fitted a lens body.

The direction in which the light is emitted from a light in accordance with that state of the art is fixedly preset after the light has been fitted in position. When such a light is used for example as a reading light in cabins of vehicles and craft, that is a disadvantage as in that case subsequent adjustment of the direction of the beam of the light must be possible in order to comply with altered ambient conditions (for example changes in the seat arrangement in the cabin).

SUMMARY OF THE INVENTION

Therefore the object of the present invention, based on the above-indicated state of the art, is to propose a spotlight in which the direction of the light beam is adjustable within predetermined limit values after fitting.

In accordance with the invention that object is attained by a spotlight which is provided with a frame which carries the lighting source, which is pivotable or rotatable about at least one horizontal and/or vertical axis, and which is adapted to be fixable in a respective selected position.

The direction of the light beam can be adjusted and fixed by virtue of the fact that there is provided a frame which carries the lighting means and which is pivotable or rotatable about at least one horizontal and/or vertical axis and which can be fixed in the respective selected position.

For that purpose it is preferably provided that said frame can be received by a receiving body and is mounted therein rotatably or pivotably about at least one horizontal axis, and that the receiving body is in turn mounted in a fixing ring and is rotatable about a vertical axis.

To fix the beam direction, it is advantageously provided that both the frame can be latched to the receiving body and also the receiving body can be latched to the fixing ring, by means of a respective spring element. The spring which provides for latching of the frame to the receiving body is supported, in an embodiment, in a groove which extends over a part of the periphery of the frame and it is substantially in the form of a portion of a circle, wherein said portion of a circle is of a somewhat smaller radius than the bottom surface of the groove. Latching of the receiving body to the fixing ring is effected resiliently by means of a projection or nose on the receiving body, wherein the projection co-operates with the uppers edge, of a toothed configuration, of the fixing ring.

A development of the invention provides that the light-emitting diodes on the one hand are fixed and connected into circuit on a printed circuit board, and on the other hand they fit with their light-emitting side in a socket or holder which individually radially encases the respective light-emitting diode, and at the light exit opening of which is fitted a lens body, and that the frame receives the holder and the lens body. In addition the frame carries a cooling body which in turn is connected to the printed circuit board in heat-conducting relationship. The connecting lines of the printed circuit board are passed through an opening in the cooling body, which after assembly is water-tightly closed, preferably by welding, so that the cooling body, the frame and the lens body form a housing which water-tightly encloses the printed circuit board with the light-emitting diodes and the holder.

In a preferred embodiment the individual parts of the spotlight are so constructed that they can be connected together solely by latching engagement one into the other.

BRIEF DESCRIPTION OF THE DRAWINGS

An embodiment of the invention will be described in greater detail hereinafter with reference to the drawings in which.

DETAILED DESCRIPTION OF A PREFERRED EMBODIMENT

Figure 1:
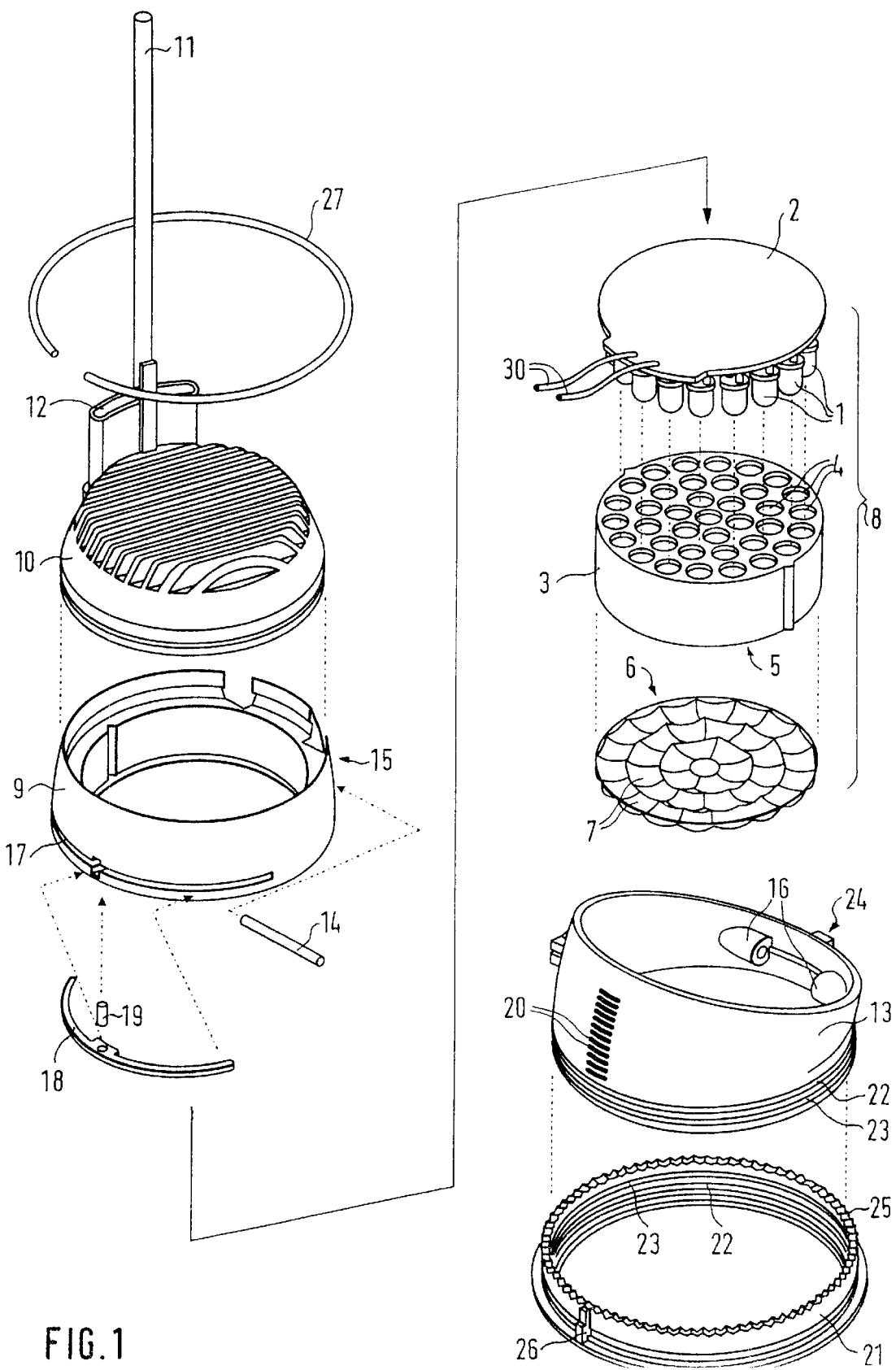
FIG. 1 is an exploded view showing the individual parts of the spotlight.
Figure 2:
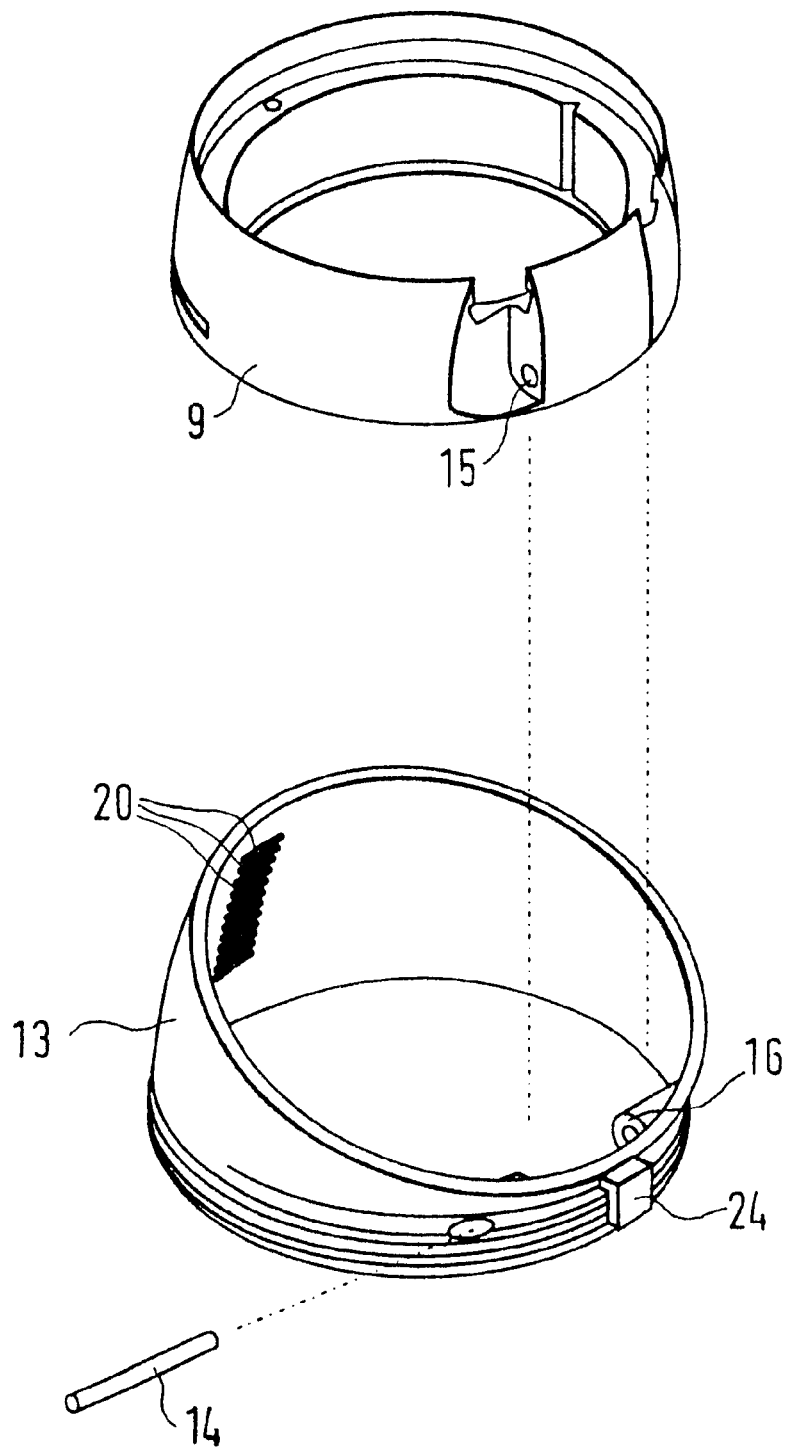
FIG. 2 shows another perspective of three of the individual parts.

The light-emitting diodes 1, in the specific embodiment described herein being luminescence conversion diodes emitting white light, are fixed, soldered and connected into circuit with their connecting legs on a printed circuit board 2. The circuitry is not shown in the drawing; it is preferably such that a certain number of light-emitting diodes are connected in series and that series is connected in parallel with one or more other series of successively connected light-emitting diodes. Connected in parallel in the reverse direction in relation to each light-emitting diode is a Zener diode so that, in the event of failure of a light-emitting diode, all other diodes continue to emit light. The light-emitting diodes are connected to the feed voltage by way of the two connecting lines 30.

The light-emitting diodes 1 which are fixed on the printed circuit board 2 can be fitted into the socket or holder 3. The holder 3 has bores 4 which extend therethrough and into each of which can be inserted a respective light-emitting diode, whereby the light-emitting diodes 1 are each individually radially enclosed by the holder 3.

A lens body 6 can be fitted onto the light exit opening 5 of the holder 3. The configuration of the lens body 6 is such that a lens element 7 comes to lie on the light exit opening 5 of each individual bore 4 which accommodates a light-emitting diode 1, whereby the light of all light-emitting diodes 1 is focussed onto a single light spot.

The light unit 8 formed from the light-emitting diodes 1, the printed circuit board 2, the holder 3 and the lens body 6 can be fitted into the frame 9 which in turn carries a cooling body 10 comprising heat-conducting material. The cooling body 10 is fitted in position in such a way that it is in heat-conducting contact with the printed circuit board 2 in order to transport to the exterior from the interior of the spotlight the heat which is generated in operation of the light-emitting diodes. The pin 19 serves to prevent the cooling body 10 from rotating on the frame 9.

The connecting lines 30 of the printed circuit board 2 are passed in a flexible tube 11 through an opening 12 in the cooling body 10. After fitting of the light, the opening 12 in the cooling body 10 is water-tightly closed, preferably by a casting or teeming procedure. The frame 9 also water-tightly encloses the lens body 6. This means that the cooling body 10, the frame 9 and the lens body 6 afford a housing which water-tightly enclosed the light-emitting diodes 1, the printed circuit board 2 and the holder 3. That prevents the insides of the lens body 6 being soiled and thus the lens elements 7 becoming cloudy and dim.

The frame 9 is of such a configuration that it can be received by a receiving body 13 and can be connected thereto by a spindle 14 in such a way that it is mounted pivotably or rotatably about that horizontally disposed axis 14.

The spindle 14 can be fitted on the one hand through a bore 15 on the rear side of the frame 9 and on the other hand it can be supported in two mountings 16 in the receiving body 13. The frame 9 and the receiving body 13 are designed in such a way that the frame 9 can be pivoted upwardly through about 20° about the axis 14 from a horizontal initial position.

A spring 18 is supported in a groove 17 in the frame 9. The spring 18 is substantially in the form of a portion of a circle which is of a somewhat smaller radius than the bottom surface of the groove 17. When the frame 9 together with the spring 18 is fitted into the receiving body 13, the spring 18 latches into the retaining openings 20 in the receiving body 13. In that way the frame 9 can be fixed in various pivotal positions in the receiving body 13.

The receiving body 13 can be fitted into and received in a fixing ring 21. In this case, the receiving body 13 and the fixing ring 21, by virtue of the provision of rings 22 and channels 23, are so designed that the receiving body 13 is mounted in the fixing ring 21 rotatably about a vertical axis (through the centre point of the circle described by the fixing ring 21). In that case, a projection or nose 24 provided at the rear side of the receiving body 13 engages resiliently into the teeth on the upper edge 25 of the fixing ring 21. As a result of that configuration, the rotary movement of the receiving body 13 in the fixing ring 21 takes place with a latching action; the spotlight can therefore also be fixed in terms of that rotary movement about a vertical axis. The stopper 26 which co-operates with the projection 24 ensures that the receiving body 13 is not rotatable to just any arbitrary extent in one direction in the fixing ring 21. It will be appreciated however in this respect that this arrangement still ensures that a rotary movement of the receiving body 13 through nearly 360° is possible.

The spotlight in the fully assembled condition is held by means of a clamping ring 27 in a suitable opening in a plate or panel which receives the spotlight, for example in the internal lining or panelling structure of an aircraft cabin. In that situation, the clamping ring 27 provides for a firm connection between the panel or the internal lining structure and the fixing ring 21.

By virtue of the possibility that the frame 9 can be pivoted upwardly out of the horizontal through about 20° and at the same time the receiving body 13 can be rotated through nearly 360°, the direction of the light beam, starting from the perpendicular, can be pivoted through about 20° towards virtually all sides, and can be fixed in position by means of a latching action. In that case, a part of the spotlight is never lower than the lower edge of the fixing ring 21 so that the spotlight which is installed in a panel or an internal lining structure always terminates flush with the panel or the internal lining structure and does not project therefrom, as is nowadays predominantly the case with pivotable spotlights in accordance with the state of the art.

What is claimed is:

1. An overhead reading light in vehicle, sea craft or aircraft cabins, comprising light-emitting diodes constituting lighting means; a body (3) radially encasing said lighting means, said body (3) having an end light exit opening (5); a lens body (6) being fitted to said light exit opening; a frame (9) carrying said lighting means; a receiving body (13) for receiving said frame (9), said frame (9) being mounted in said receiving body (13) so as to be pivotable or rotatable about a horizontal axis; said receiving body (13) being supported in a fixing ring (21); and said frame (9) being fixable in a selected pivoted or rotated position within said receiving body (13), such that the components of said overhead reading light are inhibited from extending into the interiors of said cabins.

2. An overhead reading light as claimed in claim 1, wherein said receiving body (13) is rotatable about a vertical axis.

3. An overhead reading light as claimed in claim 2, wherein a spring element facilitates latching said frame (9) to the receiving body (13).

4. An overhead reading light as claimed in claim 2, wherein said receiving body (13) comprises means for resilient latching thereof to said fixing ring (21).

5. An overhead reading light as claimed in claim 3, wherein said spring element for latching said frame (9) to said receiving body (13) comprises a spring (18) which is mounted in a groove (17) extending over a part of the periphery of the frame (9), said spring being substantially in the form of a part circle which is of a somewhat smaller radius than a bottom surface of said groove (17).

6. An overhead reading light as claimed in claim 4, wherein a nose (24) on said receiving body (13) resiliently latches said receiving body (13) to the fixing ring (21), said nose (24) co-operating with an upper edge (25) of a toothed configuration formed on the fixing ring (21).

7. An overhead reading light as claimed in claim 1, wherein:
   a printed circuit board (2) is fitted with said light-emitting diodes (1),
   said body (3) comprising a holder for receiving the light-emitting diodes (1) and constituting the body which individually radially encases respectively each of the light-emitting diodes (1); and
   a cooling body (10) which is carried by the frame (9) and which is heat-conductively connected to the printed circuit board (2).

8. An overhead reading light as claimed in claim 7, wherein said printed circuit board (2) includes connecting lines (30) extending through an opening (12) formed in the cooling body (10), said opening (12) being water-tightly closed, said frame (9) water-tightly enclosing the lens body (6) and the cooling body (10), the frame (9) and the lens body(6) jointly forming a housing which water-tightly encloses the printed circuit board (2) with the light-emitting diodes (1) and the holder (3).

9. An overhead reading light as claimed in claim 2, wherein said reading light is retained by a clamping ring (27) in a correlated opening formed in a plate or panel which receives the reading light in an internal lining structure of the vehicle, sea craft or aircraft cabins, said clamping ring (27)

providing a fixed connection between the plate or panel or the internal lining structure and said fixing ring (21).

10. An overhead reading light as claimed in claim 1, wherein interconnection between the components of said reading light is effected solely by latching engagement of said components.

11. An overhead reading light as claimed in claim 1, wherein said light-emitting diodes compares white light-emitting diodes.

* * * * *